(12) United States Patent
Spector

(10) Patent No.: US 6,224,779 B1
(45) Date of Patent: May 1, 2001

(54) INHIBITION OF ALGAE IN SWIMMING POOLS

(76) Inventor: Marshall L. Spector, 3408 Oak Hill Rd., Emmaus, PA (US) 18049

( * ) Notice: Subject to any disclaimer, the term of this patent is extended or adjusted under 35 U.S.C. 154(b) by 0 days.

(21) Appl. No.: 09/283,299

(22) Filed: Apr. 1, 1999

(51) Int. Cl.[7] ..................................................... C02F 1/76

(52) U.S. Cl. ........................... 210/754; 210/764; 210/765

(58) Field of Search ..................................... 210/754, 764, 210/765, 169, 416.1

(56) References Cited

U.S. PATENT DOCUMENTS

| | | | |
|---|---|---|---|
| 4,749,537 | * | 6/1988 | Gautschi et al. . |
| 5,078,902 | * | 1/1992 | Antelman . |
| 5,582,718 | * | 12/1996 | Sobczak . |
| 6,004,458 | * | 12/1999 | Davidson . |

* cited by examiner

Primary Examiner—Duane Smith
Assistant Examiner—Betsey Morrison Hoey
(74) Attorney, Agent, or Firm—Thomas G. Ryder

(57) ABSTRACT

This invention relates to a method and materials for inhibiting the growth of algae in swimming pools by introducing silver chloride onto a filter in a re-circulating system, whereby the silver chloride will dissolve and, thus, introduce silver ion into the body of water in the pool.

14 Claims, 2 Drawing Sheets

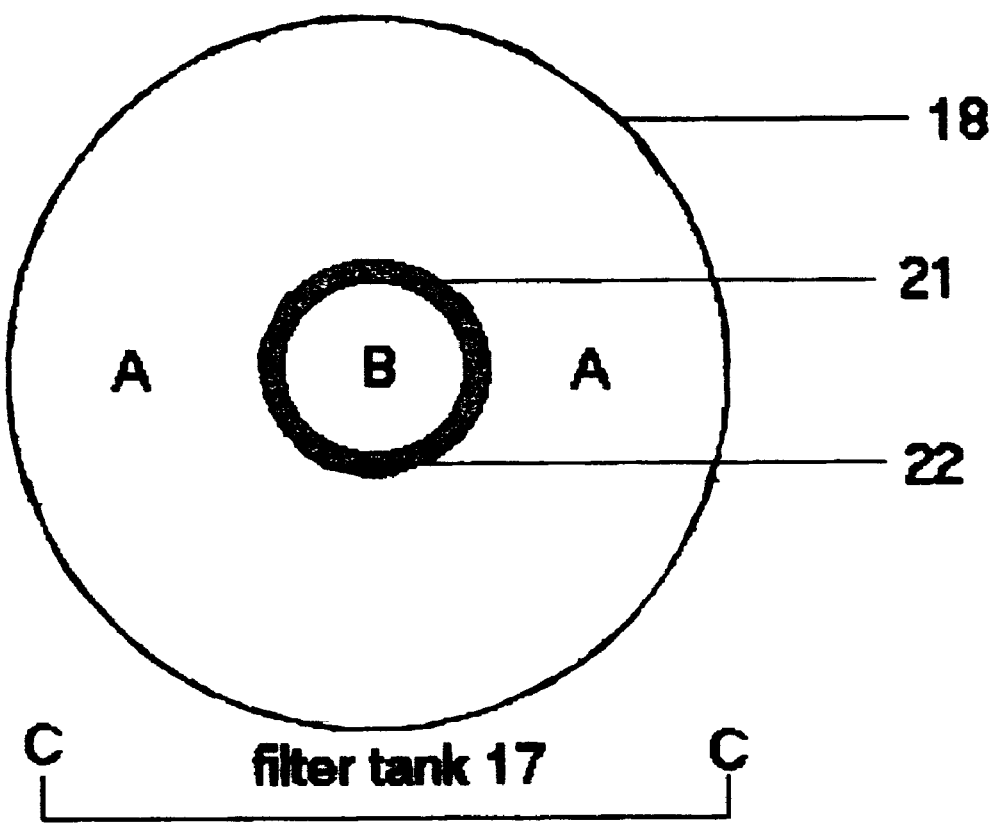

INHIBITION OF ALGAE IN SWIMMING POOLS

FIELD OF THE INVENTION

The invention relates to a method and materials for inhibiting the growth of algae in swimming pools that use chlorine as a primary disinfectant.

BACKGROUND OF THE INVENTION

Growth of algae and pathogens in swimming pool water is almost universally controlled by free chlorine at concentrations of from 1 to 3 milligrams per liter (mg/L) at pH from 7.2 to 7.6; lower chlorine concentrations are marginally effective and higher chlorine concentrations are irritating to humans. Consumption of chlorine results in the formation of chloride ion. Chlorine concentration is maintained by adding elemental chlorine and/or chlorine-releasing chemicals to the water. Examples of the latter are sodium hypochlorite, calcium hypochlorite, and trichloro-s-triaizinetrione.

Algae may be controlled by chlorine alone (at pH 7.2 to 7.6) during periods of cold weather and low solar flux, but other compounds are needed to supplement the action of chlorine during periods of warm weather and high solar flux. Such compounds include n-alkyl dimethyl benzyl ammonium chlorides and/or ions of heavy metals such as copper, silver, zinc, tin, nickel and mercury. Monovalent silver ion would be particularly advantageous because it is effective at low concentrations and is harmless to humans; it is not widely used because it is difficult to dissolve silver ion into swimming pool water without precipitating silver chloride. Upon exposure to light, silver chloride precipitate decomposes to elemental silver, a black precipitate that imparts a haze to the water and discolors pool surfaces. On the other hand, aqueous solutions of silver chloride are light-stable.

The problem of dissolving of silver ion into pool water without precipitating silver chloride is well recognized. U.S. Pat. No. 5,149,354 discloses the reaction of soluble monovalent silver salts with sodium gluconate to form water-soluble complexes with silver, which do not readily react with chloride or sulfate in pool water to form silver precipitates. Complexed silver likewise does not readily inhibit algae and pathogens and supplementation with copper metal and cupric ion is mandated. In some instances the copper compounds are substantially the major ingredient in the formulation. U.S. Pat. Nos. 5,073,382, 5,078,902, 5,089,275, 5,098,582 and 5,223,149 disclose the use of divalent and/or trivalent silver ion. Still others (U.S. Pat. Nos. 4,337,136; 4,525,253; 4,680,114; 4,781,805) effect dissolution of silver by passing a controlled electric current across silver-containing electrodes in a cell through which water is passed. U.S. Pat. No. 4,931,078 discloses a procedure in which silver salts are incorporated into molten glass which, when cooled, releases silver ions into water at a rate controlled by the surface area and chemical composition of the solid glass particles.

SUMMARY OF THE INVENTION

I have discovered an improved method for inhibiting the growth of algae in swimming pools by introducing monovalent silver ion in a manner which avoids precipitating silver chloride in the main body of water in the pool. The method of my invention does not require the use of electric current, complexing with materials such as sodium gluconate, supplementation with other metals such as copper, or incorporation into glass.

The process of my invention is directed to inhibiting the growth of algae in a swimming pool system comprising a main body of water in the pool and a re-circulation system for removing a portion of water from the main body of water in the pool, passing the removed portion of water through a filter to produce filtered water and returning the filtered water to the main body of water in the pool. The filter element is located within a filter case, which shields the filter from light. In the typical operation of a fresh water swimming pool of this type, the main body in the pool will have a pH maintained in the range of from about 7.0 to about 7.8, a temperature in the range of from about 50° F. and up to about 110° F., and have chlorine in concentrations of from about 0.3 to about 5 milligrams per liter (mg/L). The chloride concentration of the water in the pool can vary over a wide range depending upon the rate of chlorine addition to the body of water in the pool and the length of time that chlorine has been added to the pool. Accordingly, the chloride concentration in such a pool can range from as low as about 25 up to about 10,000 mg/L.

Within the above ranges, the pH is usually in the range of from about 7.2 up to about 7.6 and water temperature will usually not be in excess of about 100° F. The chlorine concentration also tends to be at least about 1 mg/L and is usually not greater than about 3 mg/L.

In accordance with my inventive process, solid silver chloride is deposited on the filter and at least a portion thereof if not all, is subsequently dissolved into the filtered water, thus furnishing soluble silver chloride, and hence uncomplexed, monovalent silver ions, to the main body of water in the pool. The quantity of silver chloride deposited on the filter being in a quantity at least sufficient to provide a silver ion concentration in the body of water in the pool up to the saturation level of silver ions at the conditions existing in the body of water in the pool. Generally, two factors determine the saturation level. They are water temperature and chloride concentration of the water in the pool. Typically, in the practice of my invention, the silver ion concentration in the body of water in the pool will be maintained in the range of from about 0.01 to about 24 micrograms of silver per liter of water. This range will be understood by reference to Table 1, below. In general operation, the silver ion concentration will be at least about 0.1 and even 0.5 micrograms per liter of water. The silver ion concentration can also be as low as 15 or even 3 micrograms per liter of water. Any of these concentrations of monovalent silver ion are effective to inhibit algae growth, however, it is preferred to utilize higher concentrations of silver ions as the temperature of the water in the pool increases. It is also advantageous to maintain the silver ion concentration, in accordance with my invention, at or close to the saturation level for the conditions existent in the pool water, although saturation is not a requirement of my invention and lower levels of silver ion concentration in the pool are generally found effective.

My invention permits a means for dissolving silver chloride into swimming pool water with minimal or no precipitation of silver chloride in the main body of pool water. Furthermore, in accordance with my invention, the silver ion is not complexed and is, thus, effective at low concentrations without addition of other heavy metal ions.

The method of my invention calls for depositing finely divided silver chloride on the filter of a pool circulation system, whereupon part or all of the deposited silver chloride is subsequently dissolved into the filtered water (filtrate), which is returned to the main body of water in the pool. Silver chloride need not be introduced as such; it may be formed in situ by reaction of silver salts with chloride in the circulating water. Examples of such salts are salts of organic acids (such as silver acetate, silver lactate and silver propionate), silver chlorate, silver fluoride, silver fluosilicate, silver nitrate, and silver sulfate.

Another aspect of my invention is to package silver chloride or other silver salts and solutions of silver salts, more soluble in water than silver chloride, in ways that permit handling without contacting skin and pool surfaces. This is accomplished by packaging such silver salt solutions in disposable syringes and by packaging such silver salts into opaque plastic, glass, paper, metal foil, or gelatin containers. These silver salts can also be mixed with binders and compressed into pills or pellets. A particularly convenient way of introducing silver compounds is to incorporate them into pellets with chlorine-releasing chemicals, such as calcium hypochlorite, and trichloro-s-triazinetrione, which also serve as binders. The pills, pellets or tablets of this invention are formulated without using any metal complexing agents, such as gluconates and ethylenediaminetetraacetic acid, or other heavy metals, such as, copper, zinc, tin, nickel and mercury.

BRIEF DESCRIPTION OF THE DRAWING

FIG. 2 is a schematic diagram showing a cross section of the DE filter of FIG. 1 taken along the line C—C in FIG. 1.

DETAILED DESCRIPTION OF THE INVENTION

Figure 1:
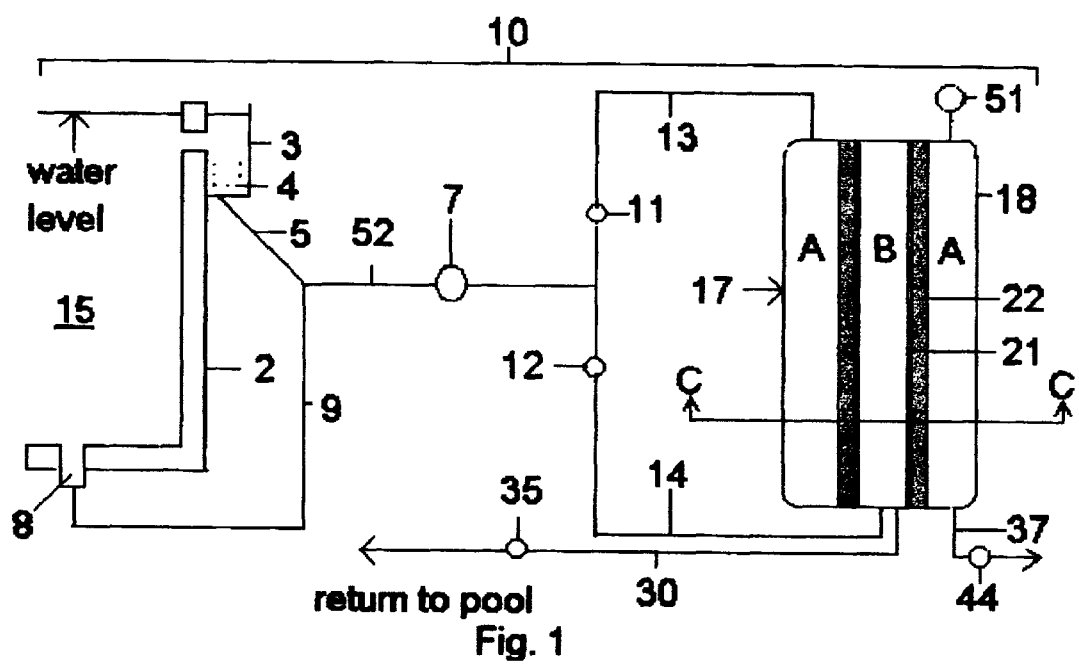
FIG. 1 is a schematic diagram depicting a swimming pool system employing a re-circulation system containing a diatomic earth (DE) filter.

Monovalent silver ion is used to augment chlorine to inhibit the growth of algae in swimming pools. The silver ion concentration required effectively to supplement chlorine in the inhibition of algae is highly variable; the concentration increases with conditions that promote algae growth, i.e. warm temperature, high solar flux and availability of nutrients such as nitrogen, phosphorous and bicarbonate. However, the maximum amount of silver that can be dissolved in chloride-containing water is limited by the solubility of silver chloride as shown in Table 1. The method of the present invention provides for the addition of sufficient silver chloride to dissolve up to 24 micrograms of silver per liter of water in the pool system. It is to be understood that the amount of silver chloride added to the filter will usually be greater than that soluble in the pool water at existent temperature and chloride concentration.

TABLE 1

Solubility of silver ion in water as a function of temperature and chloride ion concentration

| Chloride ion, mg per liter | Silver ion, micrograms per liter | | | | | | |
|---|---|---|---|---|---|---|---|
| | 50° F. | 60° F. | 70° F. | 80° F. | 90° F. | 100° F. | 110° F. |
| 25 | 6 | 10 | 17 | 28 | 48 | 76 | 120 |
| 125 | 1.1 | 2.1 | 3 | 6 | 9 | 15 | 24 |
| 250 | 0.56 | 1.0 | 1.7 | 2.8 | 5 | 8 | 12 |
| 500 | 0.28 | 0.52 | 0.84 | 1.40 | 2.3 | 4 | 6 |
| 750 | 0.19 | 0.35 | 0.56 | 0.93 | 1.5 | 2.5 | 4 |
| 1,000 | 0.14 | 0.26 | 0.42 | 0.70 | 1.2 | 1.9 | 3 |
| 1,500 | 0.09 | 0.17 | 0.28 | 0.46 | 0.8 | 1.2 | 2.0 |
| 2,000 | 0.07 | 0.13 | 0.21 | 0.35 | 0.58 | 0.93 | 1.5 |
| 2,500 | 0.06 | 0.10 | 0.17 | 0.28 | 0.46 | 0.75 | 1.2 |
| 5,000 | 0.03 | 0.05 | 0.08 | 0.14 | 0.23 | 0.37 | 0.60 |
| 10,000 | 0.01 | 0.03 | 0.04 | 0.07 | 0.12 | 0.19 | 0.30 |

If silver chloride and/or silver salts that react with chloride are added directly to the water in the pool, there is great risk that the silver chloride added, or produced in situ, will photochemically decompose to elemental silver, thus causing unsightly black deposits on pool surfaces. Therefore, in accordance with a preferred method of my invention, silver chloride and/or compounds that precipitate silver chloride are added to the re-circulating water after it has been withdrawn from the main body of pool water, but before it has entered the filter.

Silver salts having greater solubility in water than silver chloride can be introduced into the re-circulation system in the form of aqueous solutions. Thus, in the absence of a silver complexing agent, aqueous solutions of silver nitrate, silver chlorate, silver fluoride, silver fluosilicate, silver sulfate, silver acetate, silver lactate, silver propionate or combinations thereof, may be used to produce silver chloride in situ. Silver nitrate is most frequently used because of price and high water solubility.

A particularly advantageous way of packaging silver salts is to incorporate them into pellets of chlorine-releasing chemicals, such as calcium hypochlorite and trichloro-s-triazinetrione. An advantage of mixing silver salts with chlorine-releasing chemicals is that the latter are strong oxidizing agents, which inhibit reduction of silver ion to elemental silver during manufacture, storage and application. Further protection is afforded by wrapping each pill or pellet individually.

Silver salts can also be formed into tablets or pills by mixing a silver salt with a binder material and then pressing or compacting the mixture to form tablets. Binders are well known in the art of making tablets and are substances that cause the components of a mixture to cohere. I find materials such as corn starch, magnesium stearate, microcrystalline cellulose and powdered cellulose to be suitable for use in this invention. Many chlorine-releasing agents themselves function as binders, such as, for example, the chlorine-releasing compounds mentioned above.

DESCRIPTION OF THE DRAWING

Referring now to the drawing, FIG. 1 shows a pool and DE filter system indicated by the general reference numeral 10. The pool is identified by reference numeral 2 and contains the main body of pool water 15. A portion of water is continuously removed from the main body 15 via leaf trap 3 and leaf basket 4. This water flows via line 5 to line 52. Water is also removed from the main body 15 by pool drain 8 and flows via line 9 to line 52. The combined stream in line 52 is then pumped by means of pump 7 in line 52 to lines 13 and 14 containing valves 11 and 12, respectively. Each of lines 13 and 14 communicates with the interior of filter tank 17, but with different portions thereof.

As can be seen from FIGS. 1 and 2, the filter tank 17 is enclosed by case 18, and contains a zone A, to which line 13 communicates and a zone B, to which line 14 communicates. As more clearly illustrated in FIG. 2, filter tank 17 is cylindrical in shape, zone B is axially disposed within tank 17 and is defined by annular filter cloth 21 and DE filter coat 22 in a cylindrical shape. Zone A is shown as an outer annular zone defined between the filter cloth 21 and the DE filter coat 22 on the inside and by filter case 18 on the outside.

As illustrated in FIG. 1, line 13 communicates with zone A, while line 14 communicates with zone B. This figure also shows that line 30, containing valve 35, communicates with zone B, while line 37, containing valve 44 communicates with zone A. A pressure gage 51 is also connected to zone A.

When the system is in the filtration mode, valves 11 and 35 are open and valves 12 and 44 are closed. Pool water 15 flows from swimming pool 2 via leaf trap 3, leaf trap basket 4 and line 5 to line 52. Pool water 15 also flows via pool drain 8 and line 9 to line 52. Water entering line 52 flows via pump 7, valve 11 and line 13 to outer annular zone A within filter tank 17. Water then passes from zone A through DE filter coat 22 and filter cloth 21 to interior cylindrical zone B to produce filtered water. The filtered water in zone B is returned to pool 2 via line 30 and valve 35. Silver chloride added to leaf trap 3, or formed in situ by the addition of a water soluble silver salt to leaf trap 3, is deposited on the filter coat 22 and thereafter dissolves into the water being re-circulated to the main body of water 15, thereby providing silver ions to the main body of water 15.

The DE filter coat 22 retains particulate matter, including silver chloride and pool debris, thus producing a clear filtrate. When material accumulated on the filter cloth 21 and filter coat 22 causes excessive resistance to flow, as indicated by excessive pressure rise in gage 51, the holding capacity of the DE has been reached and it is necessary to backwash the filter. Valves 11 and 35 are closed and valves 12 and 44 are opened during backwash. This causes water to flow from zone B back through the filter cloth 21 and filter coat 22 to zone A. DE coat 22 is dispersed and the DE powder and retained material, including silver chloride, are flushed from the system via line 37 and valve 44.

A new DE coat is prepared by returning the valves to the filtration position (i.e., valves 11 and 35 open, while valves 12 and 44 are closed) and adding fresh DE powder to water circulating through the leaf trap 3. DE powder accumulates on the filter cloth 21 and forms a fresh DE coat 22. All or part of the silver chloride wasted with the DE can be replaced on the fresh DE coat 22 by adding silver chloride and/or compounds capable of precipitating silver chloride in situ, to water circulating through the leaf trap 3.

EXAMPLE 1

The method of the present invention was applied to inhibition of algae in a 17,000 gallon outdoor swimming pool equipped with a Hayward MICRO-CLEAR, 48-square foot Vertical Grid diatomaceous earth (DE) filter. Water was circulated from the pool proper to the filter at a rate of 70 to 80 gallons per minute. The filter case was made of thick pigmented plastic, which shielded the filter element from light. The pool was in service from May through September during each year of operation.

The pH varied between 7.0 and 7.8 and the chlorine concentration varied between about 0.5 and 5 mg/L. Chlorine concentration was maintained by addition of trichloro-s-triazinetrione tablets to the leaf trap baskets. Chlorine consumption was about 20 pounds per year and this increased the chloride concentration by about 140 mg/L per year.

During the peak summer month, the highest water temperature was 100° F. and the average solar flux was 1350 $Btu/ft^2/day$. During each of the five years of previous operation, the pool had been infested by algae, which had to be scrubbed from pool surfaces and removed by the filtration system. The presence of algae in the pool and on the filter increased chlorine consumption, while the accumulation of algae on the filter rapidly exhausted the holding capacity of the DE filter coat.

The method of this invention was initiated at the start of the sixth year, when the water temperature was 70° F. and the chloride concentration was about 750 mg/L. Two milliliters (mL) of an aqueous solution, having a concentration of 366 grams of silver nitrate per liter were dispensed from a disposable plastic syringe into water circulating through a leaf filter. A finely divided precipitate of silver chloride, weighing 616 mg, was formed in situ and was subsequently retained on the filter; the silver content was sufficient to provide 7.2 micrograms of silver ion to each liter of water in the pool system. Silver chloride dissolved in water passing through the filter until the pool water became saturated at 0.6 micrograms of silver per liter at 70° F. At that time, 564 mg of silver chloride precipitate remained on the filter. Additional silver chloride was dissolved as the water temperature increased. At 100° F., the water became saturated with 2.5 micrograms of silver ion per liter, leaving 402 mg of silver chloride remaining on the filter. At that time, the filter was backwashed and 402 mg of silver chloride were wasted along with the DE. Half of the wasted silver chloride (200 mg) was replaced on the fresh DE coat by adding 0.65 ml of silver nitrate solution to water circulating in the leaf trap.

Later in the season, when the water temperature decreased to 50° F., the solubility of silver ion in the pool water was reduced to about 0.19 micrograms per liter. There was no evidence of silver chloride precipitation in the pool due to lesser solubility at lower temperature. This is attributed to precipitation of silver chloride from circulating water onto "seed" crystals of silver chloride retained on the filter coat.

The pool was free of algae from the time silver was first introduced in May to the time the pool was closed in September.

EXAMPLE 2

In this example the method of this invention is applied to a swimming pool system similar to that employed in Example 1 and having leaf traps and a re-circulating system, including a DE filter. 3.66 mL of an aqueous solution containing 1000 mg of silver fluoride are dispensed from a graduated pipette into re-circulating pool water at a leaf trap. The chloride content of the pool water is about 250 mg/L. The temperature of the water in the pool varies from about 50°0 F. to about 110° F.; the pH ranges between 7.1 and 7.7, and the chlorine concentration varies between 1 and 4 mg/L. Silver fluoride reacts with chloride in the water to precipitate 1130 mg of silver chloride, which deposits on the surface of the DE filter. As a result of subsequent dissolution of silver chloride from the DE filter, the silver ion concentration in the pool increases from about 0.56 micrograms per liter at 50° F. to about 12 micrograms per liter at 110° F. The procedure of this example is effective to inhibit the formation of algae in the swimming pool.

EXAMPLE 3

In this example the method of the invention is applied to a swimming pool system similar to that employed above. 1.3 mL of an aqueous solution containing 42 grams of silver chlorate per liter are added to water circulating through a leaf trap. The chloride content of the pool is about 5000 mg/L. The temperature of water in the pool varies from 50° F. to 100° F.; the pH ranges between about 7.0 and 7.6, and the chlorine concentration varies between 1 and 3 mg/L. Silver chlorate reacts with chloride in the water to precipitate 40 mg of silver chloride, which deposit on the DE filter. The monovalent silver ion concentration in the pool water increases from about 0.03 micrograms per liter at 50° F. to about 0.37 micrograms per liter at 100° F. The procedure of this example is effective to inhibit the formation of algae in the swimming pool.

EXAMPLE 4

The method of the invention is applied to a swimming pool system similar to that employed above. The chloride content of the pool is about 2000 mg/L. The water temperature varies from 60° F. to 110° F.; the pH ranges between 7.2 and 7.6 and the chlorine concentration varies between 1 and 3 mg/L. The procedures set forth in Examples 1, 2 and 3 are repeated in separate tests using solutions of uncomplexed silver salts more water-soluble than silver chloride and reactable with chloride ions to precipitate silver chloride in situ. In this example the salts employed are silver acetate, silver lactate, silver propionate, silver fluosilicate, and silver sulfate. In separate tests aqueous solutions of each of these salts are added to a leaf trap in quantities and concentrations sufficient to precipitate 200 mg of silver chloride, which is in excess of the 128 mg of silver chloride required to saturate 17,000 gallons of water in the pool with silver ion at 110° F. Volumes and concentrations of these silver salt solutions required to precipitate 200 mg of silver chloride are added to the recirculation system and are listed in Table 2.

TABLE 2

| Silver salt | Conc. grams/liter | Vol. added, ml | Silver salt added, mg | AgCl added, mg |
| --- | --- | --- | --- | --- |
| Silver acetate | 7 | 33.3 | 233 | 200 |
| Silver lactate | 20 | 15.0 | 300 | 200 |
| Silver proprionate | 4 | 63.3 | 253 | 200 |
| Silver fluosilicate | 100 | 3.0 | 300 | 200 |
| Silver sulfate | 3 | 72.6 | 218 | 200 |

The separate tests of this example are each effective to inhibit the formation of algae in the swimming pool system.

EXAMPLE 5

In this example, a less preferred method of this invention is applied to a swimming pool system similar to that employed in Example 4. Chloride concentration, pH, chloride concentration and water temperature are as described in Example 4. In separate tests, an aqueous solution of each of the silver salt solutions, in the amounts and concentrations listed in Table 2, is added directly to the main body of pool water (instead of to a filter trap) during periods of minimal or zero solar flux. Silver chloride is formed and precipitated in each of the separate tests and part of the silver chloride so precipitated is deposited on the DE filter via normal circulation, part is dissolved into the main body of water, and part is decomposed to elemental silver. Part of the elemental silver in each test is transported to the DE filter via normal circulation and part settles on pool surfaces.

Shortcomings of this less preferred method are the conversion of silver ion to elemental silver and the need to scrub deposits of elemental silver from pool surfaces. However, each of the separate tests of this example is effective to inhibit the formation of algae in the pool water.

EXAMPLE 6

In this example, a less preferred method of this invention is applied to a swimming pool system similar to that employed in Example 4. Chloride concentration, chlorine concentration, pH and water temperature are as described in Example 4. In this example, 200 mg of finely divided silver chloride are added directly to the main body of pool water instead of to a filter trap during periods of minimal or zero solar flux Part of the silver chloride is transported to the DE filter via normal circulation, part is dissolved into the main body of water, and part is decomposed to elemental silver. Part of the elemental silver is transported to the DE filter via normal circulation and part settles on pool surfaces.

Shortcomings of this less preferred method are loss of silver ion by conversion to elemental silver and the need to scrub elemental silver from pool surfaces. However, the procedure of this example is effective to inhibit formation of algae in the pool water.

EXAMPLE 7

500 mg of silver chloride are mixed with 20 grams of trichloro-s-triazinetrione. The mixture is compressed to form a pellet. The pellet is placed in a leaf trap basket in a swimming pool system as described above. Upon dissolution of the pellet, silver chloride is released and carried to the filter by the circulating water. The silver chloride is deposited on the DE filter coat and slowly dissolves, thereby introducing monovalent silver ions in to the body of water in the pool. The pH of the system varies in the range of from about 7.2 to about 7.6, the temperature is in the range of from about 50° F. to about 100° F., and the monovalent silver ion concentration in the body of water in the pool is in the range of from about 0.7 to about 15 micrograms per liter. This is effective to inhibit the formation of algae in the pool.

EXAMPLE 9

300 mg of silver oxide are mixed with 200 grams of calcium hypochlorite, $Ca(ClO)_2\text{-}4H_2O$. The mixture is compressed to form a pellet. The pellet is then placed in a leaf trap basket of a swimming pool system as described above. As the pellet dissolves, the silver oxide reacts with chloride either in the pellet and/or in circulation water to produce silver chloride, which precipitates as a finely divided solid and is subsequently deposited on the DE filter coat. The silver chloride slowly dissolves into the re-circulation water, thereby introducing monovalent silver ions into the body of water in the pool up to the saturation level of silver under the conditions of temperature and chloride concentration in the pool. This procedure is effective to inhibit the formation of algae in the pool.

EXAMPLE 10

1000 g of powdered silver sulfate are mixed with 1000 g of a binder and compressed to form a batch of 2000 mg tablets. In this example separate batches of 2000 mg silver sulfate tablets are made using calcium hypochlorite, trichloro-&-triazinetrione, corn starch, magnesium stearate, microcrystalline cellulose and powdered cellulose as binders. Each tablet is wrapped to prevent contact with skin and exposure to light during subsequent handling and storage. Tablets from each of the batches described above are employed in separate tests. During application in the separate tests, tablets are unwrapped and added to a leaf filter basket of a swimming pool system as described above. A sufficient number of the silver sulfate tablets are added to the leaf filter baskets during each test to provide at least sufficient silver to saturate the body of the pool water with silver ions at the conditions existing in the pool, i.e. from about 0.01 to about 24 micrograms of silver per liter of water—depending upon water temperature and chloride concentration. As each of the tablets dissolves and/or disintegrates, silver sulfate is released and reacts with chloride in the circulation to precipitate silver chloride, which is subsequently deposited on the filter coat. This silver chloride slowly dissolves thereby releasing monovalent silver ions into the body of the pool water. Each of the separate tests is effective to inhibit the growth of algae in the pool.

EXAMPLE 11

500 g of silver lactate and 400 g of calcium hypochlorite are mixed and compressed to form a batch of 900 mg tablets. During storage and handling, the pills are protected from contact from skin and from light by a wrapper. During operation, a sufficient number of the 900 mg tablets are added to a leaf filter in a swimming pool system as described above so as to provide more silver than required to saturate the water in the body of the pool under the conditions existing in the pool This is usually in the range of from about 0.03 to about 15 micrograms per liter of water. As each tablet dissolves and/or disintegrates, silver lactate reacts with chloride to produce silver chloride, which is deposited on the filter coat. Subsequently, this silver chloride slowly dissolves and thereby introduces monovalent silver ions into the body of the pool water. This technique is effective to inhibit the formation of algae in the pool.

EXAMPLE 12

200 g of silver propionate are mixed with 1000 g of a binder consisting of corn starch and magnesium stearate. The mixture is compressed to form a batch of 1200 mg tablets. During storage and handling, the tablets are protected from contact with the skin and from light by a sugar coating and by a wrapper. During application, each tablet is unwrapped and added to a leaf trap in a swimming pool system as described above. As the tablet dissolves and/or disintegrates, the silver propionate reacts with chloride in the re-circulation water to precipitate silver chloride, which is subsequently deposited on the filter coat. A sufficient number of tablets are employed to provide more than enough monovalent silver ions to saturate the body of the pool water with silver under the conditions existing in the pool Under typical operating conditions, including a temperature in the range of from about 50° F. to about 100° F. and a chloride concentration in the range of from about 250 to about 2500 milligrams per liter of water, the monovalent silver ion concentration in the main body of water in the pool is in the range of from about 0.06 to about 8 micrograms per liter of water. The procedure of this example is effective to inhibit the formation of algae in the pool.

EXAMPLE 13

A gelatin capsule is filled with 350 mg of powdered silver chloride. During the test of this example using the swimming pool system and conditions described in Example 1, the capsule is manually opened and the contents added to water circulating through a leaf trap, thereby releasing the silver chloride into the re-circulation system upstream of the filter. The silver chloride is carried to the filter and deposited on the filter coat. Subsequently, this silver chloride slowly dissolves into the re-circulating water, thereby providing monovalent silver ions to the body of water in the pool. This procedure is effective to inhibit the formation of algae in the pool.

EXAMPLE 14

In this example, silver salts having greater water solubility than silver chloride are added to aluminum foil packets, which are then sealed. The silver salts employed and the quantity of each salt added to the foil packets is set forth in Table 3, below.

TABLE 3

| Silver salt | Amount, mg |
|---|---|
| Silver nitrate | 237 |
| Silver acetate | 233 |
| Silver lactate | 300 |
| Silver propionate | 253 |
| Silver fluosilicate | 300 |
| Silver sulfate | 218 |

During different tests using the swimming pool system and conditions described in Example 1, the packets are manually opened and the contents added to water circulating through a leaf trap, thereby precipitating during each test about 200 mg of silver chloride, which is carried to the filter and deposited on the filter coat. In each of the separate tests, the silver chloride deposited on the filler coat slowly dissolves thereby releasing monovalent silver ions into the body of water in the pool The amount of silver chloride which is precipitated in each of these tests is more than sufficient to saturate the water in the pool with monovalent silver ions at a temperature of 110° F. Each of these tests is effective to inhibit the formation of algae in the pool.

I claim:

1. A process for inhibiting the growth of algae in a swimming pool system comprising a main body of water in the pool, maintained at pH 7.0 to 7.8 and containing chlorine in concentrations from about 0.3 to about 5 milligrams per liter, and a circulation system for removing a portion of the water from the main body of water in the pool, passing the removed portion of water through a filter to produce filtered water and returning the filtered water to the main body of water in the pool; which process comprises adding silver chloride onto the filter in the re-circulation system whereby the silver chloride is dissolved into the filtered water, the silver chloride being present in a quantity sufficient to provide a monovalent silver ion concentration in the body of water in the pool in the range of from about 0.01 to about 24 micrograms of silver per liter of water.

2. The process of claim 1 wherein silver chloride is added to re-circulating water after it has been withdrawn from the pool, but before it has reached the filter.

3. The process of claim 2 wherein the water is at a temperature of from about 50° F. to about 110° F., the chlorine concentration is between 1 and 3 mg/L, and pH is in the range of from about 7.2 to about 7.8.

4. The process of claim 2, in which the water contains chloride ions in a concentration of from about 25 to about 10,000 milligrams per liter and a silver salt, having a greater solubility in water than silver chloride and reactable with chloride ions, is introduced, whereby finely divided silver chloride is precipitated in situ and is subsequently deposited onto the filter.

5. The process of claim 4 wherein the silver salt having greater solubility in water than silver chloride is a salt of an organic acid.

6. The process of claim 4 wherein the silver salt having a greater solubility in water than silver chloride is selected from the group consisting of silver nitrate, silver chlorate, silver fluoride, silver fluosilicate, silver oxide, silver sulfate silver acetate, silver lactate, and silver propionate.

7. The process of claim 1, in which the water contains chloride ions in a concentration of from about 25 to about 10,000 milligrams per liter of water and a silver salt, having a greater solubility in water than silver chloride and reactable with chloride ions, is introduced, whereby finely divided silver chloride is precipitated in situ and is subsequently deposited on to the filter.

8. The process of claim 1 wherein the water is at a temperature of from about 50° F. to about 110° F., the chlorine concentration is between 1 and 3 mg/L, and pH is in the range of from about 7.2 to about 7.6.

9. The process of claim 1 wherein the mode of adding silver chloride to the filter is by means of a tablet which comprises a material selected from the group consisting of (a) silver chloride and (b) a silver salt more soluble in water than silver chloride and reactable with chloride ions to form solid, particulate silver chloride.

10. The process of claim 9 wherein the tablet also contains a chlorine releasing agent.

11. The process of claim 9 which the silver salt more soluble in water than silver chloride is a salt of an organ acid.

12. The process of claim 9 in which the silver salt more soluble in water than silver chloride is selected from the group consisting of silver nitrate, silver chlorate, silver fluoride, silver fluosilicate, silver oxide, silver sulfate, silver acetate, silver lactate, and silver propionate.

13. The process of claim 12 in which the tablet also contains a chlorine-releasing compound.

14. The process of claim 13 wherein the chlorine releasing compound is selected from the group consisting of calcium hypochlorite and trichloro-s-triazinetrione.

* * * * *